United States Patent [19]

Yabe et al.

[11] Patent Number: 4,845,555
[45] Date of Patent: Jul. 4, 1989

[54] ELECTRONIC ENDOSCOPE APPARATUS

[75] Inventors: Hisao Yabe; Shigeru Nakajima, both of Tokyo, Japan

[73] Assignee: Olympus Optical Co., Ltd., Tokyo, Japan

[21] Appl. No.: 153,245

[22] Filed: Feb. 8, 1988

[30] Foreign Application Priority Data

Feb. 13, 1987 [JP] Japan .................................. 62-30758
Mar. 19, 1987 [JP] Japan .................................. 62-65006

[51] Int. Cl.$^4$ .............................................. H04N 7/18
[52] U.S. Cl. ........................................... 358/98; 128/4
[58] Field of Search ........................... 358/98; 128/4, 6

[56] References Cited

U.S. PATENT DOCUMENTS 4,667,230  5/1987  Arakawa et al. ....................... 358/98
4,706,118 11/1987  Kato et al. ............................. 358/98

FOREIGN PATENT DOCUMENTS 61-2120  1/1986  Japan .

Primary Examiner—James J. Groody
Assistant Examiner—Victor R. Kostak
Attorney, Agent, or Firm—Ladas & Parry

[57] ABSTRACT

A plurality of electronic endoscopes, individually having insertion sections of different lengths, are classified into a plurality of endoscope groups according to the length of the insertion section. A signal cable, having a length predetermined for each endoscope group, is disposed in an electronic endoscope which belongs to its corresponding group. An identification information member, indicative of the endoscope group, is provided at a connector section of the endoscope, and identification information of the information member is identified by an endoscope control device. The control device has a function to compensate a driving pulse transmitted to the electronic endoscope and an image signal from a solid-state image sensor of the endoscope, in accordance with the identification information (cable length information).

19 Claims, 7 Drawing Sheets

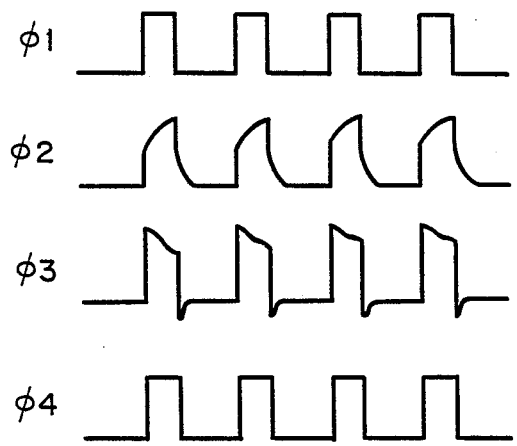
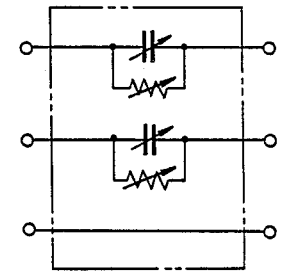
FIG. 2
FIG. 3
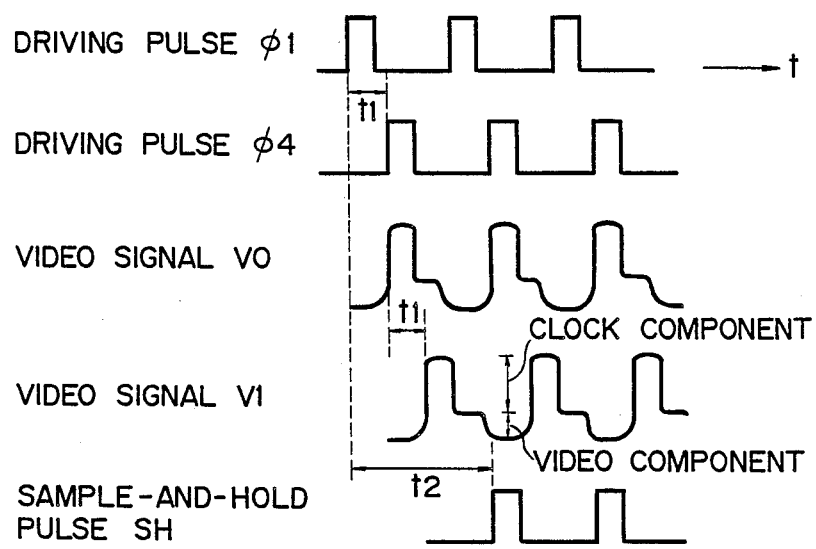
FIG. 4

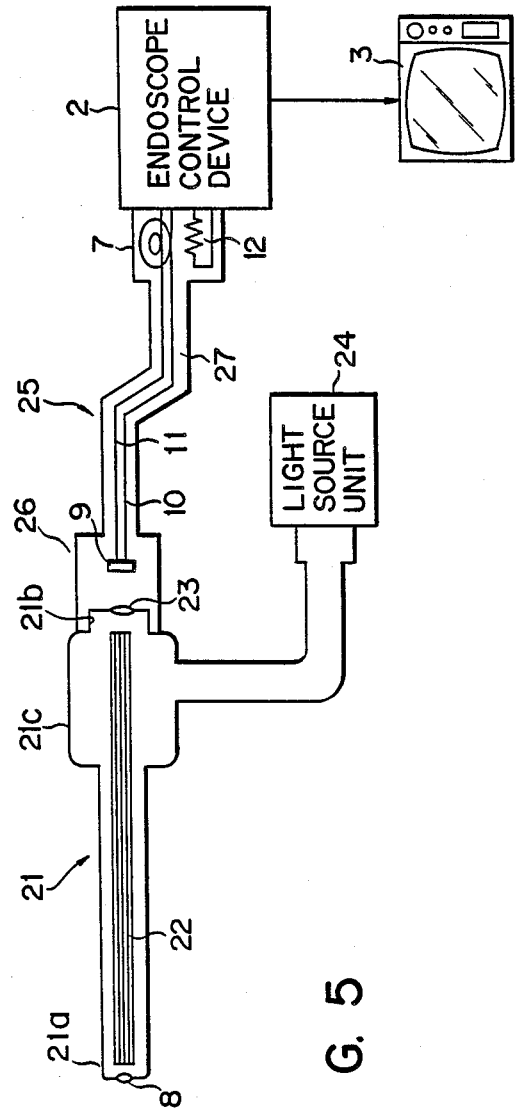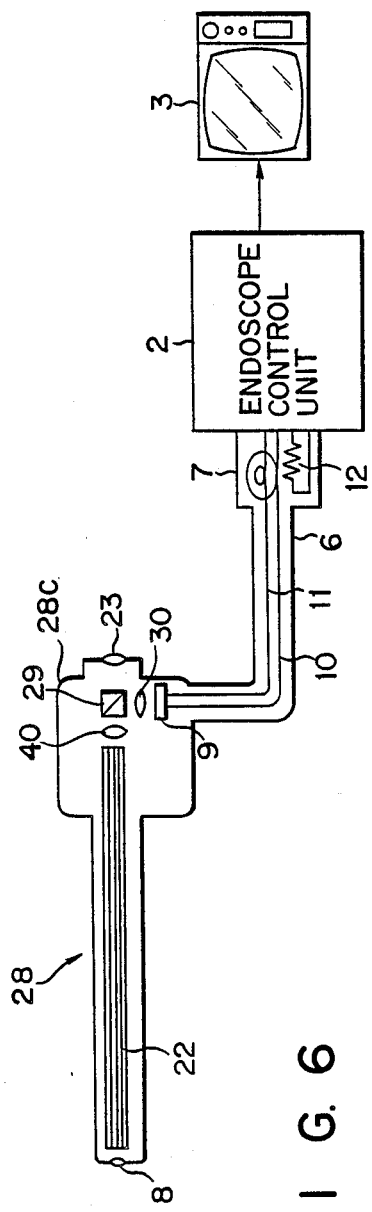
FIG. 5
FIG. 6

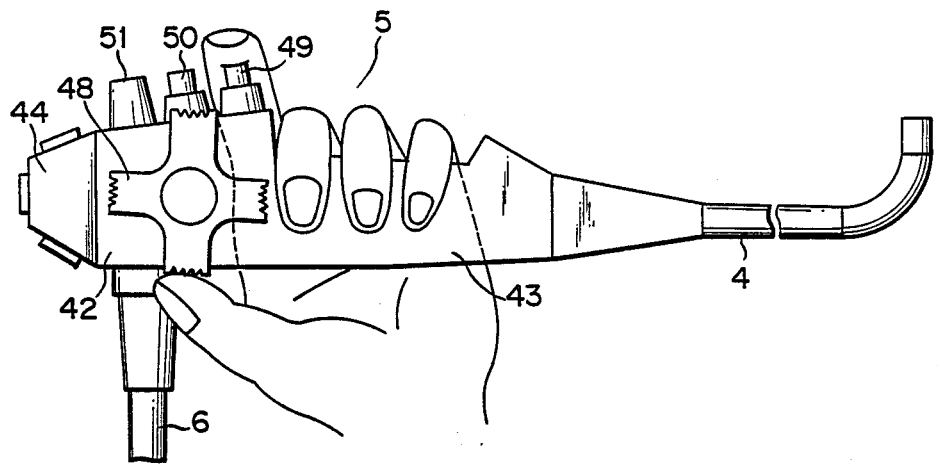
FIG. 7
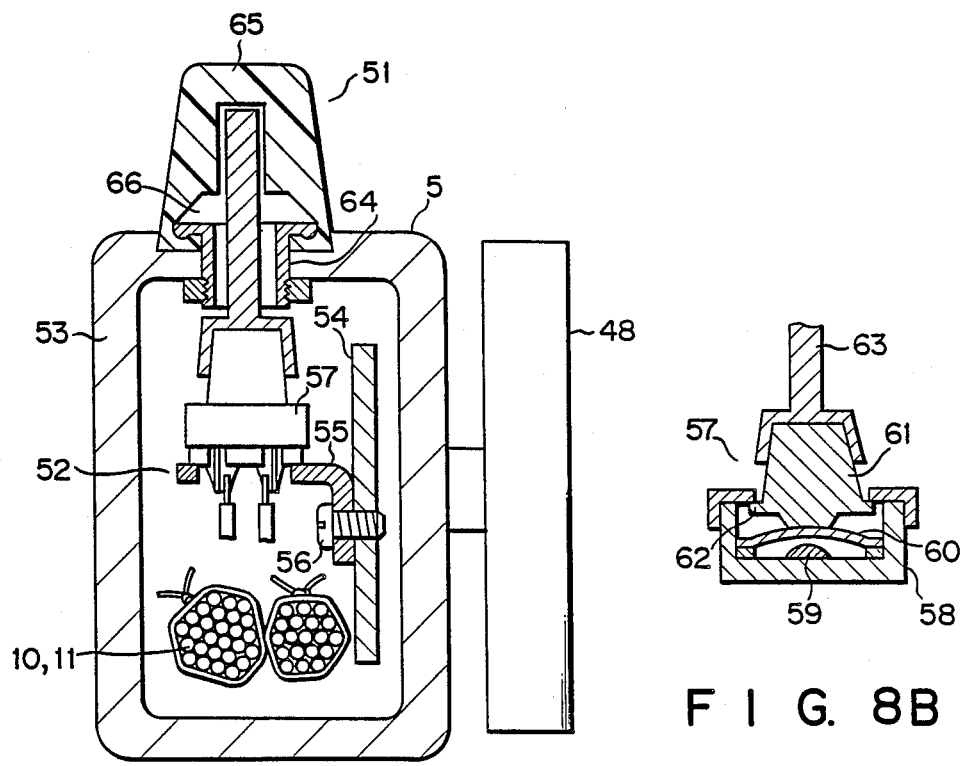
FIG. 8A
FIG. 8B

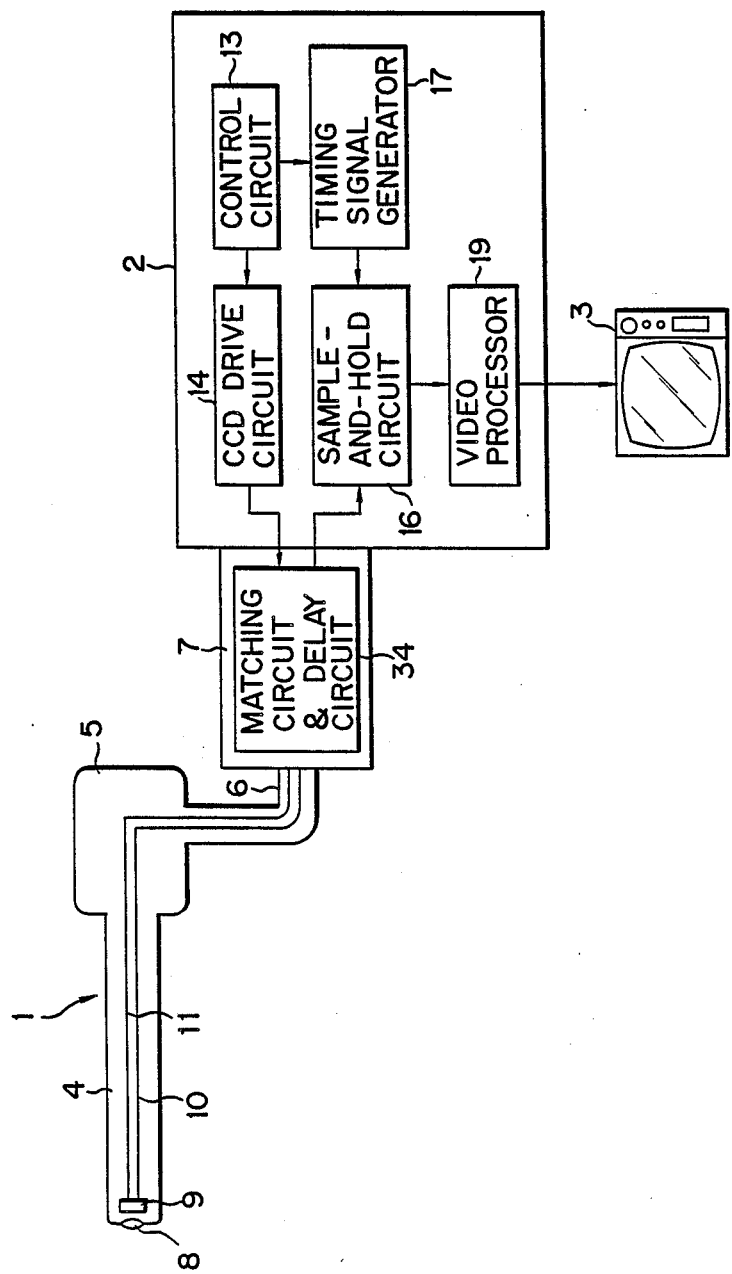
F I G. 10

4,845,555

ELECTRONIC ENDOSCOPE APPARATUS

BACKGROUND OF THE INVENTION

1. Field of the Invention

The present invention relates to an endoscope apparatus, and more specifically, to an electronic endoscope apparatus provided with a solid-state image sensor, such as a charge-coupled device.

2. Description of the related art including information disclosed under §§ 1.97–1.99.

Conventionally, an electronic endoscope contains a solid-state image sensor, such as a charge-coupled device, in its distal potion. An image of an object in the body cavity is electrically sensed by the image sensor, and an image signal delivered from the sensor is transmitted through a transmission line of the endoscope to a monitor, and is displayed as an image thereon. According to such an electronic endoscope apparatus, an endoscope control device, including e.g. a light source, video processor, etc., is provided independently of the electronic endoscope. The control device drives the image sensor, converts the image signal from the sensor into a standard television signal, and supplies the TV signal to the monitor.

In the endoscope apparatus as described above, electronic endoscopes of various types are used having insertion sections of different lengths, depending on the region to be observed. Thus, the length of the signal transmission line, extending from the solid-state image sensor at the endoscope distal portion to the endoscope control device, varies depending on the type of the endoscope used. If the transmission line is too long, the waveform of a driving pulse may possibly be distorted by a signal conductor, so that the image sensor sometimes cannot be accurately driven by the driving pulse. Moreover, the transmission of the image signal from the image sensor through the transmission line is delayed by the transmission line.

In general, an image signal from the solid-state image sensor is a scattered pulsative signal, which is held or clamped and converted into a continuous signal by the video processor in the endoscope control device. If the image signal is delayed, therefore, it is held with a time lag behind a predetermined timing, so that an accurate signal cannot be obtained from the video processor. The degree of waveform deterioration by the signal transmission line and the delay time depend on the length of the transmission line. The transmission line length varies depending on the type of the endoscope apparatus used. Presently available endoscope apparatuses include, for example, endoscope apparatuses in which a CCD TV camera is mounted on an eyepiece portion of an endoscope without a solid-state image sensor therein, apparatuses using an electronic endoscope, electronic versions of different lengths. Thus, the transmission-line delay time varies according to the endoscope apparatus used.

In order to solve these problems, a suggestion has been made that the endoscope control device or endoscope be provided with a compensation circuit for compensating the image signal depending on the type of the endoscope used. If the endoscope control device is furnished with such a signal compensation circuit, however, it is complicated in circuit configuration, and has reduced reliability. If the compensation circuit is attached to the endoscope, on the other hand, a number of compensation means must be provided for various types of endoscopes, thus entailing increase in the number of components used in the apparatus.

SUMMARY OF THE INVENTION

The object of the present invention is to provide an electronic endoscope apparatus compatible with any type of electronic endoscopes.

According to the present invention, endoscopes of a number of types are classified into a plurality of groups, depending on the length of the insertion section, for example. The signal transmission cable length is determined for each of these groups. Transmission cables of the same length are inserted into various endoscopes belonging to each group, and group identification information means is provided for group identification. When group discrimination circuit means identifies the group, based on identification information given by the group identification information means, an image signal reception circuit processes an image signal in accordance with the identified group or a transfer lag.

BRIEF DESCRIPTION OF THE DRAWINGS

FIG. 2 is a time chart showing driving pulses for driving a solid-state image sensor;

FIG. 3 is a circuit diagram of a differentiating circuit constituting a matching circuit;

Fig. 4 is a time chart showing driving pulses and image signals;

FIG. 5 is a schematic view showing an arrangement of an electronic endoscope apparatus using a fiberscope TV camera;

FIG. 6 is a schematic view showing an arrangement of an electronic endoscope apparatus furnished with an electronic endoscope of an image-guide-fiber type;

FIG. 7 is a side view of an endoscope operating section;

FIG. 8A is a sectional view of the operating section;

FIG. 8B is a sectional view of a switch member;

FIG. 10 is a schematic view showing an arrangement of an electronic endoscope apparatus with a matching circuit and a delay circuit at an endoscope connector section;

DETAILED DESCRIPTION OF THE PREFERRED EMBODIMENT

Figure 1:
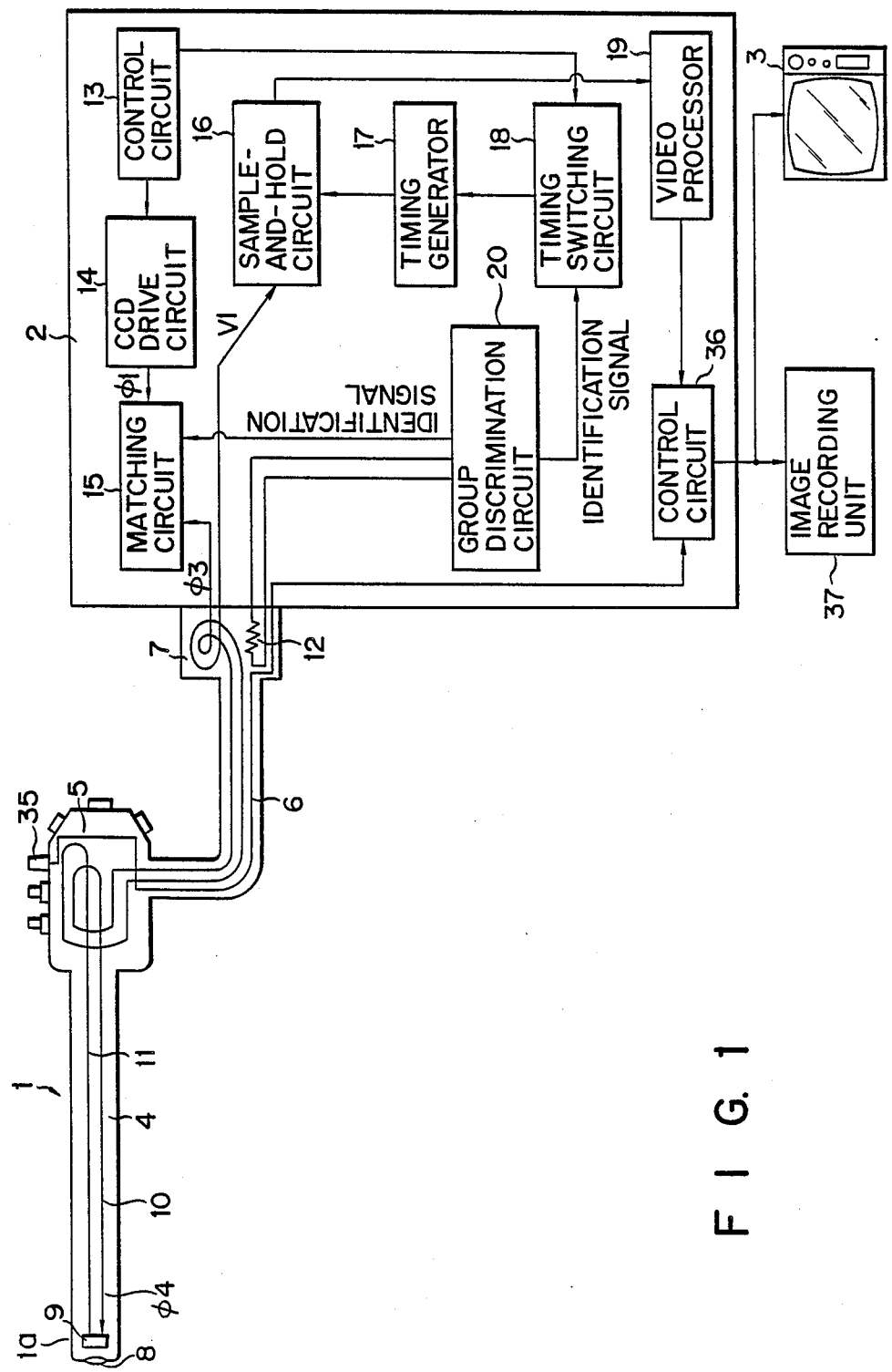
FIG. 1 is a block circuit diagram of an electronic endoscope apparatus according to an embodiment of the present invention.

In an endoscope apparatus shown in FIG. 1, endoscope 1 is adapted to be removably attached to endoscope control device 2. The image output of control device 2 is coupled to monitor 3.

Objective lens 8 is attached to the end face of the distal portion of endoscope 1, and solid-state image sensor 9 formed of e.g. a CCD is disposed in the endoscope distal portion so as to face the objective lens. Drive cable 10 and image signal transmission cable 11 are connected to image sensor 9. Cables 10 and 11 are guided through an endoscope insertion section to operating section 5. Section 5 is connected to connector section 7 by means of cable cord 6, and section 7 is adapted to be removably attached to endoscope control device 2.

Drive cable 10 and image signal transmission cable 11 are looped at operating section 5 and connector section 7, and is slackingly passed through cable cord 6. The number of loops and the degree of slackness of the cables are determined suitably when endoscopes are classified into, for example, nine groups, as will be described in detail later. At connector section 7, cables 10 and 11 are connected to matching circuit 15 and sample-and-hold circuit 16, respectively, of endoscope control device 2 by means of, for example, connecting pins (not shown). Matching circuit 15, which is composed of a differentiating circuit as shown in FIG. 3, has a function to add a differential signal component to the leading edge of a driving pulse which is delivered from CCD drive circuit 14. The differential component corresponds to deterioration of the pulse waveform caused when the driving pulse is transmitted through cable 10 to solid-state image sensor 9. For the time constant of the differential component, a value for each group is selected in response to an identification signal from group discrimination circuit 20. Circuit 20 identifies the group in accordance with the resistance value of group discrimination resistor 12, which is provided at connector section 7 of endoscope 1, and delivers the identification signal.

Sample-and-hold circuit 16, which is supplied with an image signal from solid-state image senor 9 via cable 11, receives a timing signal from timing signal generator 17, and clamps the image signal in response to the timing signal. Generator 17 is controlled by means of timing switching circuit 18. Circuit 18, which is composed of a delay circuit, receives a reference pulse from control circuit 13 and the identification signal from group discrimination circuit 20. Thereupon, the switching circuit supplies timing signal generator 17 with a control signal for a delay amount corresponding to the transfer lag time of the image signal. Thus, generator 17 delivers the timing signal to sample-and-hold circuit 16 in accordance with the transfer lag of the image signal.

The image signal, after having been clamped by sample-and-hold circuit 16 in accordance with the timing signal from timing signal generator 17, is supplied to video processor 19 to be processed thereby. The output terminal of processor 19 is connected to control circuit 36. Circuit 36 is connected to release switch 35 which is provided at operating section 5 of the endoscope. In response to the operation of switch 35, a video signal from video processor 19 is supplied to image recording unit 37 or monitor 3. Monitor 3 displays an inputted TV signal in the form of an image, while unit 37 records the video signal in response to a releasing operation.

Endoscope grouping will now be described. Endoscopes of various types are used depending on the region to be observed, and their insertion sections have different lengths. A number of endoscopes having insertion sections of different lengths are classified into several groups, depending on the resemblance in length of transmission lines. In this embodiment, as shown in Table 1, endoscopes of various types are classified into 9 groups, and the resistance value of group discrimination resistor 12 is determined for each of the 9 groups.

TABLE 1

| Group | Type of Endoscope | Length of Insertion Section (mm) | Cable Cord Length (mm) | Cable Length (mm) |
| --- | --- | --- | --- | --- |
| First group | TV camera for fiberscope | No insertion section | 1600 | 1920 |
| | Electronic endoscope with image guide fiber | Various | 1600 | |
| Second group | Cholangioscope | 300~330 | 1600 | 2520 |
| | Nasopharyngoscope | 300~365 | 1600 | |
| Third group | Bronchoscope | 550~600 | 1600 | 2920 |
| | Esophagoscope | 650~750 | | |
| | Sigmoidoscope | 620~680 | | |
| Fourth group | General-purpose endoscope for superior digestive organs | 1025~1135 | 1600 | 3220 |
| | Gastroscope | 1040~1110 | 1600 | |
| | Colonoscope (for descending colon) | 1030~1110 | | |
| | Cholangioscope | 300~330 | 2200 | |
| | Nasopharyngoscope | 300~365 | | |
| | TV camera for fiberscope | No insertion section | 2900 | |
| | Electronic endoscope with image guide fiber | Various | 2900 | |
| Fifth group | Duodenoscope | 1235~1255 | 1600 | 3520 |
| | Colonoscope | 1325~1435 | | |
| | Bronchoscope | 550~600 | 2200 | |
| | Esophagoscope | 650~750 | | |
| | Sigmoidoscope | 620~680 | | |
| Sixth group | Colonoscope (sliding-tube type) | 1675~1735 | 1600 | |
| | Enteroscope (push type) | 1610~1675 | | 3800 |
| | General-purpose endoscope for upper digestive organs | 1025~1135 | 2200 | |
| | Gastroscope | 1040~1110 | | |
| | Colonoscope (for descending colon) | 1030~1110 | | |
| Seventh group | Duodenoscope | 1235~1255 | 2200 | 3820 |
| | Colonoscope | 1325~1435 | | |
| Eighth group | Enteroscope (sonde type) | 2500 | 1600 | 4620 |
| | Colonoscope (sliding-tube type) | 1675~1735 | 2200 | |
| | Enteroscope (push type) | 1610~1675 | | |
| Ninth group | Enteroscope (sonde type) | 2500 | 2200 | 5220 |

In Table 1, 9 cable lengths are set individually for the 9 groups, and the resistance value of group discrimination resistor 12 is determined for each of the 9 cable lengths. If the cable length shown in Table 1 is longer than the effective length of the transmission line of each corresponding endoscope, the difference in length is absorbed by the slackness of cable cord 6 and loops at operating section 5 and connector section 7.

In the embodiment described above, when endoscope 1 in any of the 9 groups shown in Table 1 is connected to endoscope control device 2 by means of connector section 7, group discrimination circuit 20 identifies the group of the connected endoscope, in accordance with the resistance value of group discrimination resistor 12 at connector section 7. Then, circuit 20 delivers an identification signal indicative of the identified group to matching circuit 15 and timing switching circuit 18. Matching circuit 15 adds the differential signal component, which corresponds to a differential constant determined by the identification signal, to the driving pulse from CCD drive circuit 14.

When driving pulse $\phi1$ from CCD drive circuit 14 is transmitted, as it is, to solid-state image sensor 9 through cable 10, as shown in FIG. 2, the waveform of the driving pulse is deteriorated by the transmission line. At the input point of image sensor 9, the driving pulse assumes a waveform indicated by $\phi2$ in FIG. 2. In order to compensate such deterioration of the waveform, matching circuit 15, which includes the differentiating circuit as shown in FIG. 3, adds a differential signal component to pulse $\phi1$, and delivers driving pulse $\phi3$ to drive cable 10. When pulse $\phi3$ is transmitted through cable 10 to image sensor 9, it takes a proper waveform as indicated by $\phi4$ in FIG. 2. Thus, image sensor 9 is driven properly by proper driving pulse $\phi4$.

When it is driven by driving pulse $\phi4$, solid-state image sensor 9 outputs the image signal, which is applied to sample-and-hold circuit 16 via image signal transmission cable 11.

Transfer lag t1 is caused corresponding to the cable length for each group, as shown in FIG. 4, before driving pulse $\phi4$, corresponding to driving pulse $\phi1$ delivered from CCD drive circuit 14, reaches solid-state image sensor 9. Time lag t1 is also caused before image signal V0, delivered from image sensor 9, reaches sample-and-hold circuit 16. In consideration of both transfer lag times for transmission and reception, therefore, the image signal must be sampled and held. The timing for such sample and hold is controlled by means of the signal from timing signal generator 17. In response to the identification signal from discrimination circuit 20, an internal delay element, for example, of timing switching circuit 18 is switched, and circuit 18 delivers the control signal to generator 17 with a delay equivalent to the delay amount of the delay element, behind the delivery of the reference pulse from control circuit 13. In response to the control signal from timing switching circuit 18, generator 17 applies the timing signal to sample-and-hold circuit 16. In response to the timing signal, circuit 16 samples and holds the image signal.

If cables 10 and 11 have the same length, the delay amount can be adjusted to 2t1. Since these cables may be different in length, however, the delay amount or delay time is set to t2. Thus, image signal V1 is sampled and held after the lapse of time t2 following the delivery of driving pulse $\phi1$ from CCD drive circuit 14.

FIG. 5 shows a case such that TV camera 25 for endoscope is connected to endoscope control device 2. In this case, endoscope 21 has image guide fiber 22 which extends from objective lens 8 disposed on distal portion 21a to eyepiece 23 disposed on eyepiece portion 21b of operating section 21c. Fiber 22 serves to transmit an incident optical image from lens 8 to eyepiece 23. Further, the endoscope is provided with a light guide fiber (not shown), which serves to guide an illumination light from light source unit 24 into the body cavity.

Camera 25 for fiberscope is mounted on eyepiece portion 21b. It is composed of image sensing portion 26 attached to eyepiece portion 21b and containing solid-state image sensor 9 therein, connector section 7 removably coupled to endoscope control device 2, and cable cord 27 which connects portions 26 and 7 and contains transmission cables 10 and 11. Connector portion 7 contains group discrimination resistor 12 and looped portions of cables 10 and 11.

Fiberscope camera 25, which belongs to a first group as shown in Table 1, includes cable cord 27 of 1,600-mm length, which contain cables of 1,920-mm length. The driving pulse and the image signal are transferred between solid-state image sensor 9 and endoscope control device 2 by means of cables 10 and 11. During this signal transfer, the first group, to which camera 25 belongs, is identified by group discrimination circuit 20, on the basis of the resistance value of group discrimination resistor 12. In accordance with identification information thus obtained, the driving pulse and the image signal are processed in the same manner as in the embodiment shown in FIG. 1.

FIG. 6 shows a case such that endoscope 28, which has solid-state image sensor 9 at operating section 28c thereof, is connected to endoscope control device 2. In this case, lens 40 and half prism 29 are arranged successively at operating section 28c so as to face image guide fiber 22. Image sensor 9 is located on the optical axis of half prism 29 with lens 30 between sensor 9 and prism 29. The optical axis of prism 29 crosses that of fiber 22 at right angles. Cables 10 and 11 extend from image sensor 9 to connector section 7 through cable cord 6.

In FIG. 6, an optical image transmitted through image guide fiber 22 is guided through lens 40 and half mirror 29 to eyepiece 23, and is also guided to solid-state image sensor 9 by mirror 29. Image sensor 9 converts the incident optical image into an image signal, and delivers it to endoscope control device 2 through cable 11. Control device 2 detects the resistance value of group discrimination resistor 12 at connector section 7, thereby identifying the group to which endoscope 28 connected thereto belongs. According to Table 1, endoscope 28 belongs to the first group. In accordance with the identification information, control device 2 processes the driving pulse supplied to image sensor 9 and the image signal delivered from the sensor.

In fiberscope TV camera 25 shown in FIG. 5, cable cord 27 has a length of 1,600 mm, control device 2 and light source unit 24 are formed separately. In some cases, therefore, device 2 should preferably be situated at a distance from unit 24. In such an arrangement, a cable cord of 2,900-mm length and cables of 3,220-mm length are suitably used for the TV camera. This fiberscope TV camera belongs to a fourth group as shown in Table 1.

Endoscope control device 2 and monitor 3, as shown in FIG. 1, are sometimes expected to be located on the other side of a bed on which a patient lies. In such a case, it is more convenient to make cable cord 6 of endoscope 1 longer. For example, the cable cord is made 2,200 mm long. In this case, the cable length is set to 4,120 mm, coming under an eighth group, as shown in Table 1.

The operating efficiency of the endoscope apparatus can be improved by combining an optimum insertion section length, corresponding to the region to be examined, with an optimum cable length which corresponds to the layout of the apparatus in an examination room.

Although a resistor is used as group discrimination means in the embodiment described above, it may be replaced with any other suitable member or members. For example, the discrimination means may comprise three pins disposed in connector section 7 and three microswitches attached to endoscope control device 2. The pins and microswitches are arranged facing to each other, so as to constitute three bits. That is, the pin or pins are selectively disposed on connector section 7 so that three bits represent one of eight decimal values. When connector section 7 is connected to control device 2, the microswitches are selectively actuated by the pin or pins of connector section 7, thereby representing one of the eight decimal values which is used for discriminating one group among endoscope groups. Accordingly, three bits constituted by three microswitches and pins can represent eight kinds of discrimination. If four pins and four microswitches are used, 16 groups of endoscope can be discriminated.

The endoscope is provided with the light guide fiber for guiding the illumination light into the body cavity. Since the spectral transmittance of the light guide fiber is not uniform, however, the fiber changes its light coloring condition, depending on its length. If the fiber has a relatively high transmittance for blue, for example, the illumination light is colored blue as the fiber becomes longer. As a result, the image obtained from the body cavity is blue. It is therefore advisable to correct the color of the image. According this embodiment, the cable length and the light guide length are substantially equal, so that the color correction can be performed in accordance with the group identification information.

If cables 10 and 11 are contained in operating section 5 in a partially looped manner, as shown in FIG. 1, they are arranged in the manner shown in FIG. 8. As shown in FIG. 7, operating section 5 is an integral structure including body 42, grip portion 43, and switch box 44. From body 42 extends cable cord 6 which is connected to endoscope control device 2. Angle knob 48 is operated to bend the distal portion of insertion section 4. Air/water feed button 49 and water feed button 50 are arranged on body 32. Switch button 51 can be used as a trigger switch for the camera unit, for example.

FIG. 8A is a sectional view of operating section 5. In FIG. 8A, cables 10 and 11 are located in the space inside operating section 5 so as to face switch mechanism 52 of switch button 51. In this case, cables 10 and 11 each include 9 cables, which are bundled and looped twice within the inside space of section 5. Thus, 18 cables are bound into one bundle on one side of the loop, and 24 cables into another on the other side.

Operating section 5 has a frame 53 to which plate-shaped base 54 is fixed. L-shaped switch base 55 is mounted to base 54 by screw 56. Switch member 57 is mounted on switch base 55. Switch member 57 comprises a box-shaped casing 58 having an upper opening, a first contact element 59 and a second contact element 60, as shown in FIG. 8B. First contact element 59 projects from the bottom of casing 58, and second contact element 60 is formed of an arch-shaped elastic member, and is supported at its edges to the lower portions of casing 58.

Rocking member 61 is rockably contact with second contact element 60, and forced upwardly by the elastic force of second contact element 60. Rocking member 61 has flange 62 at its lower portion. Flange 62 is engaged at the bend part formed on the upper portion of casing 58, whereby rocking member 61 is supported to casing 58.

Operating lever 63 is mounted at its lower part on rocking member 61, and projected from through hole 64 formed in the upper portion of frame 53. Switch buttom 65 is liquid-tightly attached to frame 53 with lever 63 being inserted into the hole of switch buttom 65. Switch buttom 65 is formed of elastic material, for example, synthetic resin, and has at its lower part a cavity portion 66 for permitting switch buttom 65 to be easily moved.

Switch buttom 65 is pressed from its side operating lever 63 is tilted at rocking member acting as a fulcrum, and thus downwardly presses second contact element 60 to contact it with first contact element 59. Switch member 57 constructed as described above can be actuated, if switch buttom 65 is pressed in any directions.

Figure 9:
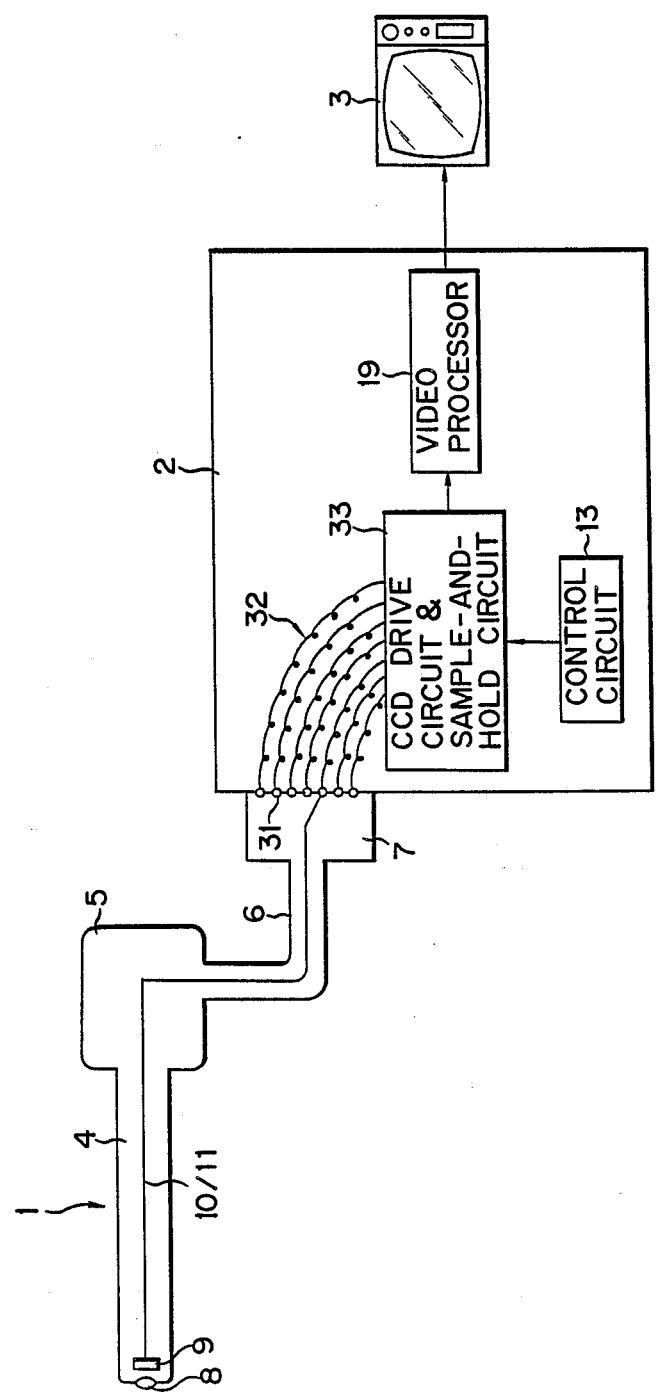
FIG. 9 is a schematic view showing an arrangement of an electronic endoscope apparatus with a group of cables for cable compensation in an endoscope control device.

According to another embodiment shown in Fig. 9, the cable length is compensated by means of cable group 32 disposed in endoscope control device 2. In this case, 7 connector contacts 31 are arranged at connector section 7, and CCD drive cable 10 and image signal transmission cable 11 are connected selectively to contacts 31. Cable group 32 for cable compensation is connected to contacts 31. Group 32 includes 7 cables with different lengths of, e.g., 2,800 mm, 2,200 mm, 1,800 mm, 1,500 mm, 1,200 mm, 900 mm, and 100 mm. These cables of group 32 correspond individually to the groups of endoscopes shown in Table 1.

When the individual cables of cable group 32 are connected selectively to cables 10 and 11 of the endoscope, the sum of the respective lengths of cable 10 and the selected cable of group 32 corresponding thereto is always equal to the sum of the lengths of cable 11 and its corresponding selected cable. For each group, therefore, the time constant and the delay time are constant, and the driving pulse and the image signal are compensated in accordance with the time constant and the delay time.

According to the embodiment shown in FIG. 9, matching circuit 15, timing switching circuit 18, and group discrimination circuit 20 are not required at all, so that the apparatus is improved in reliability and lowered in cost.

According to still another embodiment shown in FIG. 10, solid-state image sensor 9 is provided at the distal portion of the endoscope so as to face objective lens 8. Image sensor 9 is connected to a matching circuit and delay circuit 34 at connector section 7 by means of cables 10 and 11, which extend through insertion section 4, operating section 5, and cable cord 6. Connector section 7 is adapted to be removably attached to endoscope control device 2. When the connector section is connected to control device 2, the matching circuit and delay circuit 34 are connected to CCD drive circuit 14 and sample-and-hold circuit 16. As in the case of FIG. 1, circuits 14 and 16 are controlled by means of control circuit 13 and timing signal generator 17, respectively. The output of circuit 16 is connected to monitor 3 through video processor 19.

In the embodiment shown in FIG. 10, cables 10 and 11 have a length for each corresponding endoscope group shown in Table 1. The matching circuit and delay circuit 34 have a fixed time constant and delay time determined for each group. Accordingly, these circuits can be incorporated in an exclusive-use IC or RC-embedded, multilayer substrate for each group, so that circuit 34 can be miniaturized. Thus, connector section 7 or endoscope 1, which contains circuit 34, cannot be too bulky. Since a number of endoscopes can utilize such ICs, exclusive-use ICs can be mass-produced at relatively low cost.

Figure 11:
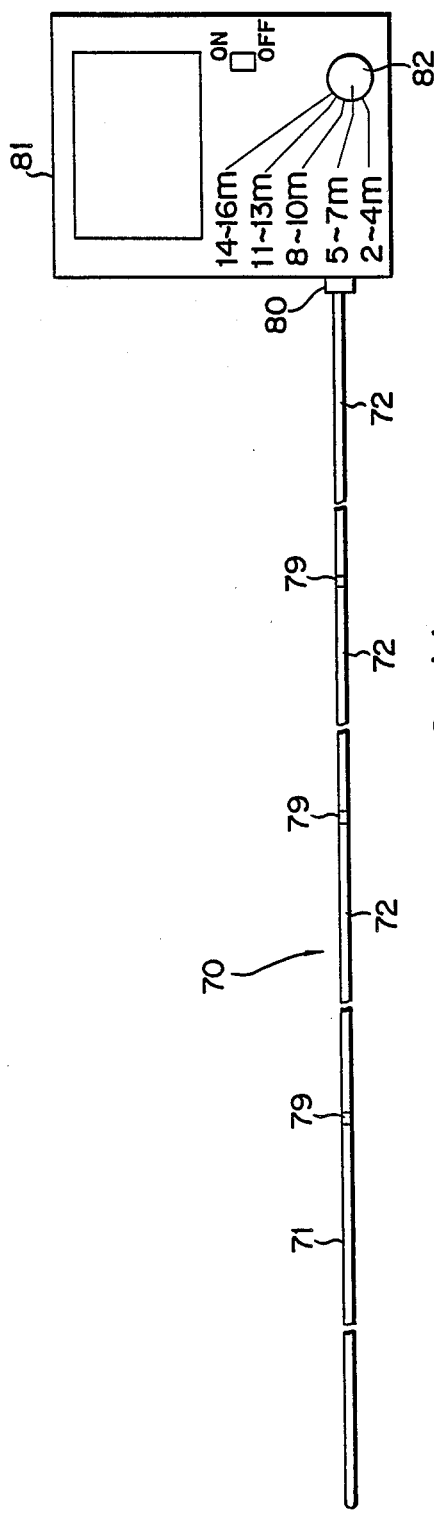
FIG. 11 is a schematic view showing an arrangement of an electronic endoscope apparatus for disaster relief.

Although the present invention is applied to medical-use endoscopes according to the embodiment described above, it may be also applied to endoscopes for disaster relief, for example. The disaster-relief endoscopes are used to examine the inside of fallen houses or landslides. FIG. 11 shows one such endoscope.

In the endoscope shown in FIG. 11, insertion section 70 comprises distal insertion unit 71 of 2 m length and a plurality of extension insertion units 72 with a length of 1 m each. Distal unit 71 is provided with objective lens system 73, illumination lens 74, lamp 75, and solid-state image sensor 76. Cables 10 and 11 and feeder cable 77 are passed through units 71 and 72.

Figure 12:
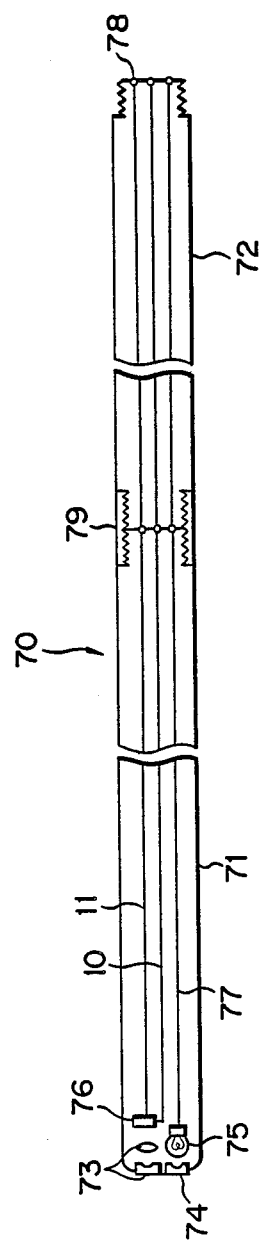
FIG. 12 is a sectional view of an insertion section of the endoscope shown in FIG. 11.

At the maximum, 14 extension insertion units 72 can be connected, and the length of insertion section 50 can be changed between 2 mm and 16 mm, depending on the number of connected units 72. A screw is formed around each connecting end portion of distal insertion unit 71 and extension insertion units 72 for their connection. Connecting terminals 78 are arranged on each connecting end face. The insertion units are connected in the manner shown in FIG. 12, with the aid of both handed screws 79. With use of such connecting means, there are no projections at the junctions (screws 59), so that insertion section 70 can be inserted smoothly. Moreover, insertion units 71 and 72 need not be rotated when they are connected or disconnected.

Insertion section 70 is connected to endoscope control/monitor device 81 by means of connector 80. Device 81 is provided with cable-length compensation member 82, which can compensate the cable length for five groups; 2 to 4 m, 5 to 7 m, 8 to 10 m, 11 to 13 m, and 14 to 16 m. The compensation can be effected in blocks of 1 m for each group. The group is selected by manually switching compensation member 82.

If insertion section 70 is lengthened, the resistance of cables 11 and 77 increases. In such a case, the gain of a video amplifier and the lamp voltage are increased.

Thus, the insertion section is divided into a plurality of insertion units, and the insertion units are connected before use. Accordingly, the apparatus can be transported with ease, and can be operated substantially without a twist of the insertion section.

The present invention is not limited to the embodiments described above, an may be also applied to pipe cameras or monitor cameras. Moreover, the solid-state image sensor may be replaced with an image pickup tube. This image sensing device may be of a single-, two- or three-tube type, or a single-, two- or three-plate type.

The cable length is not limited to the values shown in Table 1. The allowable range for the variation of the cable length depends on the image quality required, as well as on the type of the solid-state image sensor or the cables used. In an endoscope apparatus using an image sensor which is relatively tolerant of the deterioration of the driving pulse waveform, for example, the driving signals may be classified into 3 groups, or the lags of image output may be classified into 7 groups. Thus, the number of groups may be determined individually for items in question. Furthermore, the present invention can provide satisfactory effects or measures to counter various problems caused by the difference in cable length, as well as the deterioration of the driving pulse waveform and the transfer lag of the image signal.

These various problems include the transfer lag, waveform change, or attenuation of the driving signal, the transfer lag, waveform deterioration, or attenuation of the image output signal, differences in sensitivity attributable thereto, etc.

The allowable range for the length of the insertion section (including signal cables) available for common use, which depends on the properties of the solid-state image sensor or the cables, is not limited to the values shown in Table 1. The apparatus of the present invention can be used to obtain color images. The color image sensing system to be used in this case may be the face sequential system or the simultaneous system.

In the embodiments described above, signal cables of a uniform length are used for each group of endoscopes, and the signal transfer lag is constant for each group. Alternatively, however, signal cables of lengths corresponding individually to the insertion sections of various endoscopes may be provided for the endoscopes. In this case, resistors are connected individually to the signal cables, whereby the differences in transmission line length between the endoscopes of the individual groups are compensated.

What is claimed is:

1. An electronic endoscope apparatus comprising:
   image sensing means attached to each of a plurality of endoscopes of various types and adapted to electronically sense an endoscopic image and deliver an image signal;
   image sensing control means adapted to be connected to each of the image sensing means attached to their corresponding endoscopes and to deliver a driving signal for driving the image sensing means and process the image signal from the image sensing means;
   signal transmission means connecting the image sensing means and the image sensing control means, having a transmission line length corresponding to the distance between the image sensing means and the image sensing control means, and adapted to transmit the driving signal and the image signal,
   said signal transmission means including one of a plurality of transmission cable means individually having predetermined cable lengths for a predetermined number of groups of transmission lines obtained by grouping a plurality of different transmission line lengths;
   identification information means having one of a plurality of identification information predetermined for the transmission line groups and corresponding individually to the cable lengths;
   discrimination means for identifying the identification information of the identification information means and delivering an identification signal; and
   compensation means for compensating at least one of the driving signal and the image signal in accordance with the identification information delivered from the discrimination means.

2. The electronic endoscope apparatus according to claim 1, wherein said endoscopes fitted with said image sensing means include endoscopes of a plurality of types individually including insertion sections of different lengths, and said transmission cable means includes one of a plurality of signal cables inserted individually in the insertion sections of the endoscopes.

3. The electronic endoscope apparatus according to claim 2, wherein the insertion section of each of said endoscopes has a distal portion, and said image sensing means includes a solid-state image sensor provided at the distal portion and connected to one of the signal cables corresponding thereto.

4. The electronic endoscope apparatus according to claim 1, wherein at least one of said endoscopes has a fiberscope including image guide fiber means for optically transmitting the optical endoscopic image and an eyepiece portion for outputting the endoscopic image delivered thereto through the image guide fiber means, and said image sensing means is a fiberscope camera attached to the eyepiece portion of the fiberscope.

5. The electronic endoscope apparatus according to claim 1, wherein each said endoscope includes an insertion section having a distal portion to receive the endoscopic image, an image guide fiber for optically transmitting the endoscopic image, and an operating section for controlling the distal portion of the insertion section; and said image sensing means is provided at the operating section and includes a solid-state image sensor for sensing the endoscopic image transmitted to the operating section by means of the image guide fiber.

6. The electronic endoscope apparatus according to claim 1, wherein said identification information means is provided for each of the endoscope.

7. The electronic endoscope apparatus according to claim 1, wherein each said endoscope includes an insertion section having a distal portion to receive the endoscopic image, an operating section coupled to the insertion section and used to control the distal portion of the insertion section, a cable cord extending from the operating section, and a connector section provided at the distal end of the cable cord; said image sensing means includes a solid-state image sensor provided at the distal portion; and one of said transmission cable means includes a signal cable extending from the solid-state image sensor at the distal portion to the connector section, through the insertion section, the operating section, and the cable cord.

8. The electronic endoscope apparatus according to claim 7, wherein said signal cable is contained in the insertion section and/or the connector section in a looped manner.

9. The electronic endoscope apparatus according to claim 1, wherein said compensation means includes means for adding a differential component, corresponding to the identification information, to the driving signal, in order to compensate deterioration of the waveform of the driving signal caused when the driving signal is transmitted through the transmission cable means to the image sensing means.

10. The electronic endoscope apparatus according to claim 1, wherein said compensation means includes delay means for delaying the timing for the image signal processing by the image sensing control means, in accordance with the identification information, in order to compensate a transfer lag caused when the image signal is transmitted from the image sensing means through the transmission cable means to the image sensing control means.

11. The electronic endoscope apparatus according to claim 1, wherein said signal transmission means includes auxiliary cable means connected to the image sensing control means and the transmission cable means in order to keep the transmission cable length uniform for each transmission line group.

12. An electronic endoscope apparatus comprising:
a plurality of electronic endoscopes individually including a plurality of insertion sections of different lengths each having a distal portion, each of said endoscopes further including solid-state image sensing means attached to the distal end portion of the insertion section and adapted to electronically sense an endoscopic image and deliver an image signal;
image sensing control means adapted to be connected to the image sensing means of at least one of the electronic endoscopes and to deliver a driving signal for driving the image sensing means and process the image signal from the image sensing means;
a plurality of signal cable means inserted individually to the insertion sections and connecting the image sensing means and the image sensing control means, each said cable means having a length corresponding to that of each corresponding insertion section and adapted to transmit the driving signal and the image signal;
a plurality of identification information means provided individually for the electronic endoscopes, and having identification information predetermined for a predetermined number of groups of transmission lines obtained by grouping the cable means according to different lengths, and corresponding individually to the cable lengths;
discrimination means for identifying the identification information of the identification information means and delivering an identification signal; and
compensation means for compensating the driving signal and/or the image signal in accordance with the identification information delivered from the discrimination means.

13. An electronic endoscope apparatus comprising:
a plurality of electronic endoscopes individually including a plurality of insertion sections of different lengths and each having a distal portion, each of said endoscopes further including solid-state image sensing means attached to the distal end portion of the insertion section and adapted to electronically sense an endoscopic image and deliver an image signal;
image sensing control means adapted to be connected to the image sensing means of at least one of the electronic endoscopes and to deliver a driving signal for driving the image sensing means and process the image signal from the image sensing means;
a plurality of first signal cables inserted individually into the insertion sections and connecting the image sensing means and the image sensing control means, each of said cables having a length corresponding to that of a corresponding insertion section and adapted to transmit the driving signal and the image signal, said first signal cables being grouped in a predetermined number of cable groups based on the different lengths of said insertion sections;
a plurality of second signal cables provided in said image sensing control means, in correspondence with the lengths of said first signal cables and the predetermined cable groups; and
connector means for selectively connecting said first signal cables and said second signal cables.

14. The electronic endoscope apparatus according to claim 13, wherein the sum of the lengths of the ones of said first and second signal cables which are selectively connected by said connector means has a constant value.

15. The electronic endoscope apparatus according to claim 13, wherein said first signal cables each have a signal transmission characteristic equal to that of each of said second signal cables.

16. An electronic endoscope apparatus comprising:
a plurality of electronic endoscopes individually including a plurality of insertion sections of different lengths and each having a distal portion, each of said endoscopes further including solid-state image sensing means attached to the distal end portion of the insertion section and adapted to electronically sense an endoscopic image and deliver an image signal;

image sensing control means adapted to be connected to the image sensing means of at least one of the electronic endoscopes and to deliver a driving signal for driving the image sensing means and process the image signal from the image sensing means;

a plurality of signal cables inserted individually into the insertion sections and connecting the image sensing means and the image sensing control means, each of said cables having a length corresponding to that of a corresponding insertion section and adapted to transmit the driving signal and the image signal, said signal cables being grouped in a predetermined number of cable groups based on the different lengths of said insertion sections.

a plurality of correction circuit means provided in said electronic endoscopes, in correspondence with the cable groups, respectively, for correcting at least one of the driving signal and the image signal.

17. The electronic endoscope apparatus according to claim 16, wherein said endoscopes each have a connector, and said correction circuit means each are provided within said connector.

18. An electronic endoscope apparatus comprising:

a plurality of electronic endoscopes individually including a plurality of insertion sections of different lengths and each having a distal portion, each of said endoscopes further including solid-state image sensing means attached to the distal end portion of the insertion section and adapted to electronically sense an endoscopic image and deliver an image signal;

image sensing control means adapted to be connected to the image sensing means of at least one of the electronic endoscopes and to deliver a driving signal for driving the image sensing means and process the image signal from the image sensing means;

a plurality of signal cables inserted individually into the insertion sections and connecting the image sensing means and the image sensing control means, each of said cables having a length corresponding to that of a corresponding insertion section and adapted to transmit the driving signal and the image signal, said signal cables being grouped in a predetermined number of cable groups based on the different lengths of said insertion sections;

a plurality of correction circuit means provided in said image sensing control means, in correspondence with the cable groups, respectively, and switched in accordance with the lengths of said signal cables, for correcting at least one of the driving signal and the image signal.

19. The electronic endoscope apparatus according to claim 18, wherein said electronic endoscopes each have a plurality of insertion units capable of being selectively connected in serial, for correcting at least one of the driving signal and the image signal.

* * * * *